United States Patent
Li

(10) Patent No.: US 8,503,881 B1
(45) Date of Patent: Aug. 6, 2013

(54) SYSTEMS FOR EXTENDING WDM TRANSMISSION INTO THE O-BAND

(75) Inventor: Guifang Li, Oviedo, FL (US)

(73) Assignee: University of Central Florida Research Foundation, Inc., Orlando, FL (US)

( * ) Notice: Subject to any disclaimer, the term of this patent is extended or adjusted under 35 U.S.C. 154(b) by 991 days.

(21) Appl. No.: 12/062,030

(22) Filed: Apr. 3, 2008

Related U.S. Application Data

(60) Provisional application No. 60/922,093, filed on Apr. 6, 2007.

(51) Int. Cl.
*H04J 14/02* (2006.01)

(52) U.S. Cl.
USPC ............... 398/81; 398/82; 398/91; 398/79; 398/95

(58) Field of Classification Search
USPC ............ 398/81, 82, 135, 91, 158, 79, 141, 398/147, 148, 159, 25, 28, 29, 95
See application file for complete search history.

(56) References Cited

U.S. PATENT DOCUMENTS

| | | | | |
|---|---|---|---|---|
| 5,696,614 | A * | 12/1997 | Ishikawa et al. | 398/81 |
| 6,205,268 | B1 * | 3/2001 | Chraplyvy et al. | 385/24 |
| 6,417,945 | B2 * | 7/2002 | Ishikawa et al. | 398/79 |
| 6,424,420 | B1 * | 7/2002 | Nakaya | 356/477 |
| 6,501,579 | B2 | 12/2002 | Li et al. | |
| 6,563,630 | B1 * | 5/2003 | Jacob et al. | 359/341.2 |
| 6,895,185 | B1 * | 5/2005 | Chung et al. | 398/72 |
| 7,003,205 | B2 | 2/2006 | Cho et al. | |
| 7,224,863 | B1 | 5/2007 | Li et al. | |
| 7,319,819 | B2 * | 1/2008 | Guy | 398/81 |
| 7,346,279 | B1 * | 3/2008 | Li et al. | 398/32 |
| 7,903,974 | B2 * | 3/2011 | Jang et al. | 398/79 |
| 8,213,797 | B2 * | 7/2012 | Mostert et al. | 398/69 |
| 8,417,117 | B2 * | 4/2013 | Smith et al. | 398/58 |
| 2001/0028489 | A1 * | 10/2001 | Ishikawa et al. | 359/124 |
| 2002/0141046 | A1 * | 10/2002 | Joo et al. | 359/341.2 |
| 2003/0090768 | A1 * | 5/2003 | Liu et al. | 359/183 |

(Continued)

OTHER PUBLICATIONS

Applications of O-band semiconductor optical ampliers in febre-optic telecommunication networks, by Jarslaw Piotr Tukiewicz @2006.*

(Continued)

*Primary Examiner* — Daniel Washburn
*Assistant Examiner* — Hibret Woldekidan
(74) *Attorney, Agent, or Firm* — Brian S. Steinberger; Phyllis K. Wood; Law Offices of Brian S. Steinberger, P.A.

(57) ABSTRACT

Method, apparatus and systems for a wavelength division multiplexing system operating at O-Band. The system includes a transmitter for wavelength division multiplexing digital O-band optical channels into a multiplexed optical signal, amplifying and transmitting the multiplexed optical signal, a fiber transmission span using constant intensity modulation and semiconductor optical amplification, and a receiver for receiving and amplifying the transmitted multiplexed optical signal and restoring the individual digital O-band optical signals. In an embodiment, the transmission span is a single mode fiber transmission span and in another embodiment includes an optical amplifier module coupled into the fiber transmission span. In another embodiment, the transmission span includes a length of O-band dispersion compensating fiber to reduce four-wave mixing. In another embodiment the system uses wavelength division multiplexing in combination with polarization interleaving. In another embodiment, the wavelength division multiplexing system operates at both O-Band and C-Band.

8 Claims, 7 Drawing Sheets

U.S. PATENT DOCUMENTS

| | | | |
|---|---|---|---|
| 2003/0215237 A1* | 11/2003 | Sugahara | 398/81 |
| 2004/0001715 A1* | 1/2004 | Katagiri et al. | 398/81 |
| 2004/0008989 A1* | 1/2004 | Hung | 398/69 |
| 2004/0190903 A1* | 9/2004 | Miura et al. | 398/79 |
| 2005/0089335 A1* | 4/2005 | Guy | 398/147 |
| 2005/0111851 A1* | 5/2005 | Kim et al. | 398/161 |
| 2005/0238362 A1* | 10/2005 | Sekiya et al. | 398/147 |
| 2006/0188267 A1* | 8/2006 | Gavrilovic et al. | 398/188 |
| 2006/0209392 A1* | 9/2006 | Caponi et al. | 359/337.4 |
| 2006/0291036 A1* | 12/2006 | Shukunami et al. | 359/333 |
| 2007/0166040 A1* | 7/2007 | Jang et al. | 398/85 |
| 2007/0297801 A1* | 12/2007 | Mostert et al. | 398/81 |
| 2008/0089692 A1* | 4/2008 | Sorin | 398/135 |

OTHER PUBLICATIONS

Yan Han, Guifang Li, "Direct detection differential polarization-phase-shift keying based on Jones vector" Optics Express, 2004, 12, (24), pp. 5821-5826.

Gilad Goldfarb, Guifang Li, "Dispersion Compensation of up to 25,200ps/nm Using IIR Filtering?" Optical Society of America, 2007, 3 pages.

* cited by examiner

SYSTEMS FOR EXTENDING WDM TRANSMISSION INTO THE O-BAND

This application claims the benefit of priority to U.S. Provisional Application No. 60/922,093 filed on Apr. 6, 2007.

FIELD OF THE INVENTION

This invention relates to telecommunication and, in particular, to methods, apparatus and systems for extending wavelength-division multiplexed transmission into the O-band.

BACKGROUND AND PRIOR ART

In an optical communication network for transferring high capacity information in Wavelength Division Multiplexing (WDM) mode, N optical signals with different wavelengths are multiplexed and concurrently transmitted through one strand of an optical fiber. The C-band wavelength region (1530 nm to 1565 nm) and the L-band wavelength region (1570 nm to 1605 nm) are principally used in the optical signals transmitted through the optical fiber, in which the transmission characteristic of optical signals is good. Meanwhile, for the purpose of wide-band/large-capacity transmission in an optical communication network of the WDM mode, researches have been vigorously made in order to use the O-band wavelength region (1285 nm to 1330 nm) and the S-band wavelength region (1460 nm to 1530 nm).

U.S. Pat. No. 7,003,205 issued on Feb. 21, 2006 discloses a wide-band dispersion controlled optical fiber. The optical fiber enables the use of optical signals in various wavelength regions in a wavelength division multiplexing mode communication network by controlling the position of the zero dispersion wavelength, and enables long distance transmission by controlling dispersion slope and bending loss. Furthermore, there is an advantage in that the optical fiber enables not only short distance transmission but also middle/long distance transmission using a single type of optical fiber because the optical fiber is controlled to have negative dispersion values in the O-band wavelength region and positive dispersion values with small deviations in the C-band and L-band wavelength regions.

When compared to the time-division multiplexing communication mode, the wave-division multiplexing communication mode is advantageous in that transmission capacity is greatly increased at small expense. Due to such an advantage, the wave-division multiplexing mode has been continuously developed for optical communication networks. However, the focus of prior art wave-division multiplexing transmission has been in the C-band and L-band.

Thus, what is needed is a method of extending wave-division multiplexed transmission into the O-band.

SUMMARY OF THE INVENTION

A primary objective of the invention is to provide methods, apparatus and systems for extending wavelength-division multiplexed transmission into the 1.3 micron O-band.

A secondary objective of the invention is to provide methods, apparatus and systems for wave-division multiplexing transmission in the O-band, where constant intensity modulation formats are used.

A third objective of the invention is to provide methods, apparatus and systems for wave-division multiplexing extending into the O-band for applications including telecommunication, security and defense.

A fourth objective of the invention is to provide methods, apparatus and systems for wave-division multiplexing extending into the O-band with full dispersion compensation at O-Band.

A fifth objective of the invention is to provide methods, apparatus and systems for wave-division multiplexing extending into the O-band in combination with polarization interleaving to reduce the effect of optical nonlinearity.

A sixth objective of the invention is to provide methods, apparatus and systems for wave-division multiplexing extending into the O-band with dispersion elements to reduce four-wave mixing.

A first preferred embodiment of the invention provides a wavelength division multiplexing system operating at O-Band. The system includes a transmitter for wavelength division multiplexing plural individual digital O-band optical channels into a multiplexed optical signal and amplifying and transmitting the multiplexed optical signal, a fiber transmission span using constant intensity modulation and semiconductor optical amplification, and a receiver for receiving and amplifying the transmitted multiplexed optical signal and restoring the individual digital O-band optical signals. In an embodiment, the transmission span is a single mode fiber transmission span and in another embodiment includes an optical amplifier module coupled into the fiber transmission span. In another embodiment, the transmission span includes a length of O-band dispersion compensating fiber to reduce four-wave mixing.

In an embodiment, the receiver includes coherent demodulation using a local oscillator and alternatively includes a Raman pump source. In another embodiment, the transmitter includes polarization interleaving. Alternatively, the optical amplifier module includes wavelength interleaving for separating the optical channels to reduce four-wave mixing.

A second embodiment provides a wavelength division multiplexing system operating at O-Band and C-Band. The system includes an O-Band transmitter for generating a digital O-Band optical signal, a C-Band transmitter for generating a digital C-Band optical signal, an O-Band and a C-Band optical amplifier module connected with the O-Band and C-Band transmitters respectively, for amplifying the O-Band and C-Band optical signals and a wavelength division multiplexer for wavelength multiplexing the O-Band optical signal with the C-Band optical signal. The multiplexed optical signal is transmitted over a fiber transmission span using constant intensity modulation and semiconductor optical amplification. The opposite end of the transmission span is coupled with a demultiplexer for receiving the transmitted multiplexed optical signal and restoring and O-Band and C-Band optical signals, an O-Band and a C-Band receivers for receiving restored digital O-Band and C-Band optical signals.

In an embodiment, the transmission span of the O-Band and C-Band system includes a wavelength division demultiplexer coupled an end of the single mode fiber for restoring the length of single mode fiber for restoring the original O-Band optical signal and C-band optical signal, a length of O-Band optical dispersion compensation serially coupled with an O-Band optical amplifier for dispersion compensation and amplification coupled with the output of the wavelength division demultiplexer, a length of C-Band optical dispersion compensation serially coupled with an C-Band optical amplifier for dispersion compensation and amplification coupled with the output of the wavelength division demultiplexer, and a second wavelength division multiplexer for multiplexing the amplified O-Band and C-Band optical signals for transmission over a second length of single mode fiber.

Further objects and advantages of this invention will be apparent from the following detailed description of preferred embodiments which are illustrated schematically in the accompanying drawings.

DESCRIPTION OF THE PREFERRED EMBODIMENTS

Figure 1:
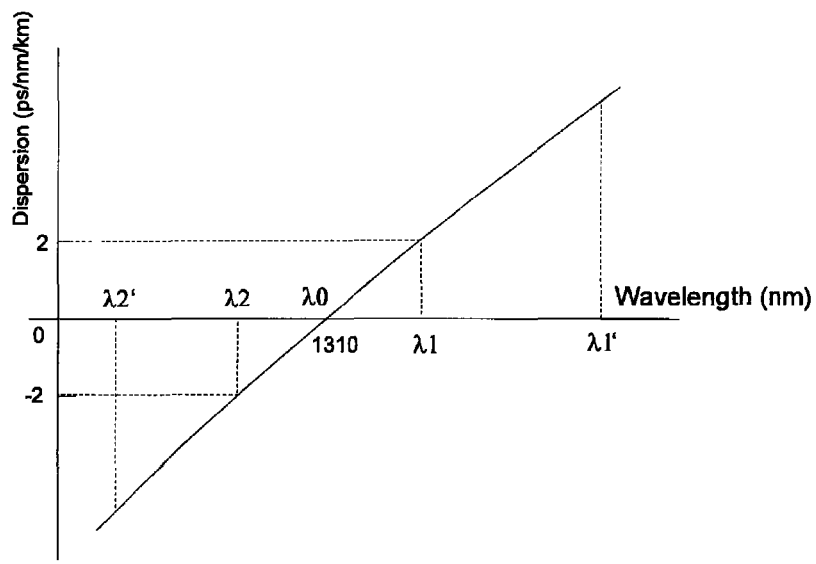
FIG. 1 is a graph showing the operating wavelength range of a transmission system in the O-band according to the present invention.

Before explaining the disclosed embodiments of the present invention in detail it is to be understood that the invention is not limited in its application to the details of the particular arrangements shown since the invention is capable of other embodiments. Also, the terminology used herein is for the purpose of description and not of limitation.

The following is a list of the reference numbers used in the drawings and the detailed specification to identify components:

100 WDM transmission system
10 transmitter
11 input signals
12 multiplexer
13 optical amplifier module
14 transmission span
15 standard mode fiber
16 dispersion compensating fiber
17 receiver
18 de-multiplexer
19 received signals
40 polarization interleaving transmitter
41A digital optical signals
41B digital optical signals
42A multiplexer 1
42B multiplexer 2
43 polarization beam combiner
44 transmission span
45A first polarization state
45B second polarization state
60 wavelength interleaving
61 input optical signal
62 interleaver
63 optical signal output 1
64 semiconductor optical amplifier
65 optical signal output
66 semiconductor optical amplifier
67 interleaver
68 interleaved optical output
71A optical amplifier module
71B optical amplifier module
72A Raman pump source
72B Raman pump source
73A wavelength division multiplexer
73B wavelength division multiplexer
74 single mode fiber
75 dispersion compensated fiber
81A multi-wavelength transmitter at 1310 nm band
81B multi-wavelength transmitter at 1560 nm band
82A optical amplifier module
82B optical amplifier module
83A wavelength division multiplexer
83B wavelength division multiplexer
83C wavelength division multiplexer
84 single mode fiber
85A dispersion compensated fiber
85B dispersion compensated fiber
86A optical amplifier module
86B optical amplifier module
87A multi-wavelength receiver at 1310 nm band
87B multi-wavelength receiver at 1560 nm band
88A wavelength division demultiplexer
88B wavelength division demultiplexer FIG. 1 is a graph showing the operating wavelength range of a transmission system in the O-band. The present invention provides methods, apparatus and systems for wave-division multiplexing transmission in the O-band. The present invention uses a combination of constant intensity modulation formats and semiconductor optical amplifiers. For example, the modulation format can be phase-shift keying or differential phase-shift keying, or can be polarization-shift keying or differential polarization-shift keying.

Figure 2:
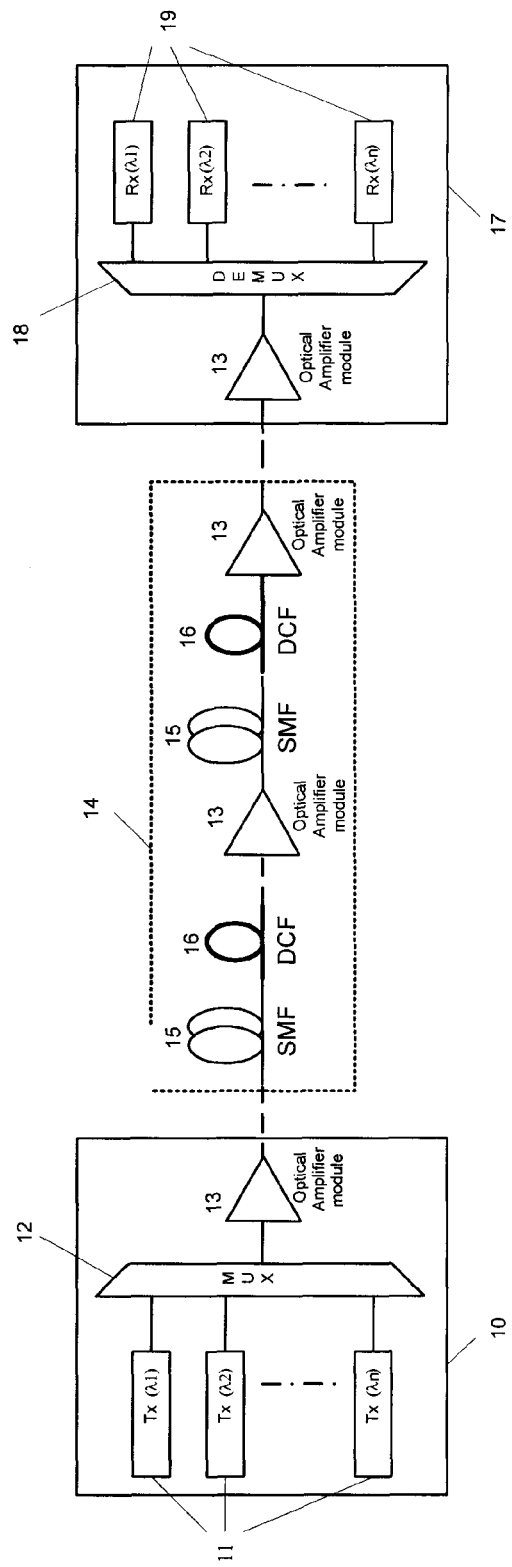
FIG. 2 is a schematic diagram of a wave-division multiplexing system at O-band according to the present invention.

FIG. 2 is a schematic diagram of a wave-division multiplexing transmission system 100 at O-band wavelength according to the present invention, where constant intensity modulation formats are used. In a preferred embodiment, the system incorporates one or more optical amplifier modules 13 and dispersion compensation fibers 16 designed for Four-Wave-Mixing mitigation. As shown, a combination of content-intensity modulation formats and semiconductor optical amplifiers 13 are used to achieve this goal.

Figure 3:
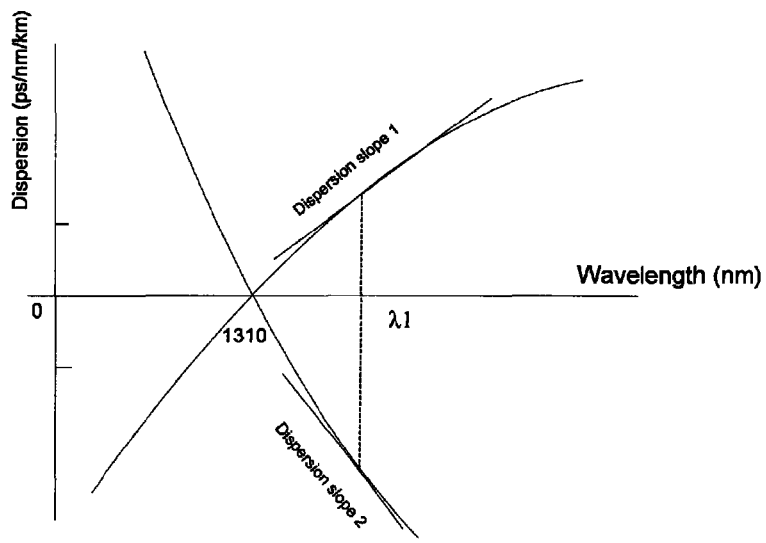
FIG. 3 is a graph showing the dispersion curve of a standard single mode fiber and specially designed dispersion compensating fiber shown in FIG. 1.

In an embodiment, the transmission span 14 consists of standard single mode fiber (SMF) 15 with optional dispersion compensating fiber (DCF) 16. The span of dispersion compensation fiber 16 is spliced into the transmission span in order to nullify the dispersion caused by the transmission fiber. The transmission span 14 also includes optical amplifier modules 13 for boosting the signals during the transmission. The dispersion characteristics of standard single mode fiber and dispersion compensating fiber are shown in FIG. 3 The graph shows dispersion curve of a standard single mode fiber and specially designed dispersion compensating fiber shown in FIG. 1 for the purpose of full dispersion compensation at O-band.

Figure 4:
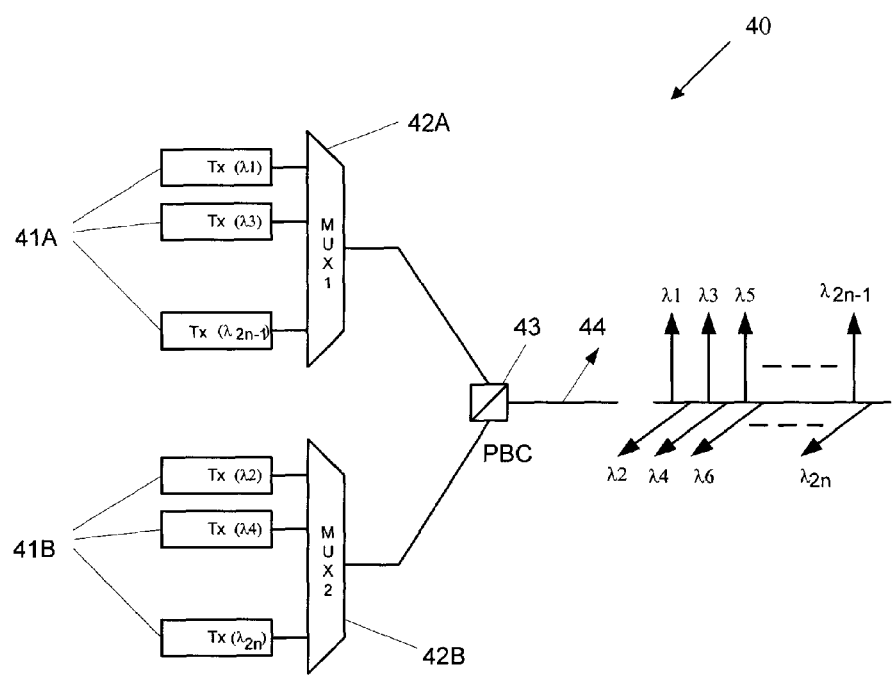
FIG. 4 is a schematic diagram showing polarization interleaving in a preferred embodiment of transmitter shown in FIG. 2.

Furthermore, wavelength division multiplexing transmission can be used in combination with polarization interleaving to reduce the effect of optical nonlinearity as shown in FIG. 4. FIG. 4 is a schematic diagram a transmitter in a preferred embodiment using polarization interleaving as the preferred embodiment of the transmitter for the transmission system shown in FIG. 2. The polarization interleaving system shown includes two sets of input optical signals 41A and 41B. Optical signals 41A are multiplexed together at multiplexer 42A to form a single multiplexed optical signal. Similarly optical signals 41B are multiplexed and the multiplexed optical signals from the two multiplexers 42A and 42B are combined using a polarization beam combiner 43 to combine polarization interleaving with wavelength division multiplexing for transmission over transmission span 44. FIG. 4 also shows the relative polarization state for the wave-division multiplexing channels shown as 45A and 45B. As shown, wave-division multiplexing can be used in combination with polarization interleaving to reduce the effect of optical nonlinearity.

Figure 5A:
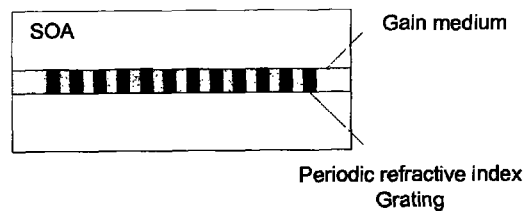
FIG. 5a shows a specific design of four-wave-mixing mitigation for semiconductor optical amplifier in the optical amplifier module shown in FIG. 3.
Figure 5B:
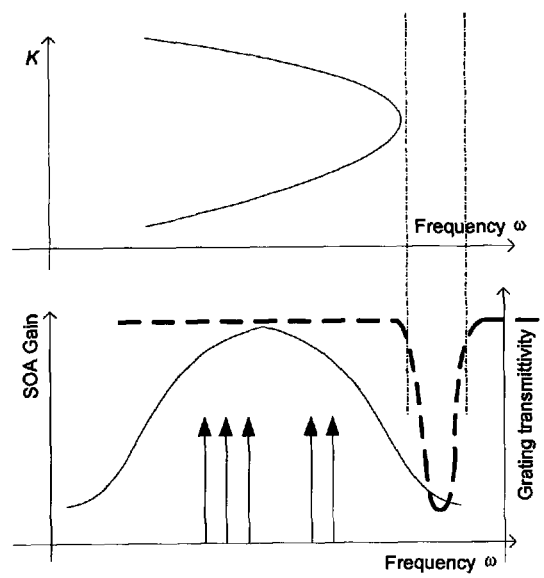
FIG. 5b shows the characteristics of a semiconductor optical amplifier for explaining the means for four-wave mixing mitigation.

In order to reduce the nonlinearity in the optical amplifiers, especially semiconductor optical amplifiers, the present invention uses artificially introduced dispersion elements to reduce four-wave mixing (FWM) as shown in FIG. 5. FIG. 5a shows a specific design of four-wave-mixing mitigation for semiconductor optical amplifier in the optical amplifier module shown in FIG. 3. FIG. 5b shows the characteristics of a semiconductor optical amplifier for explaining the means for four-wave mixing mitigation. Nonlinearity can be further mitigated in the semiconductor optical amplifier by increasing channel space in the semiconductor optical amplifier using wavelength interleaving as shown in FIG. 6.

Figure 6:
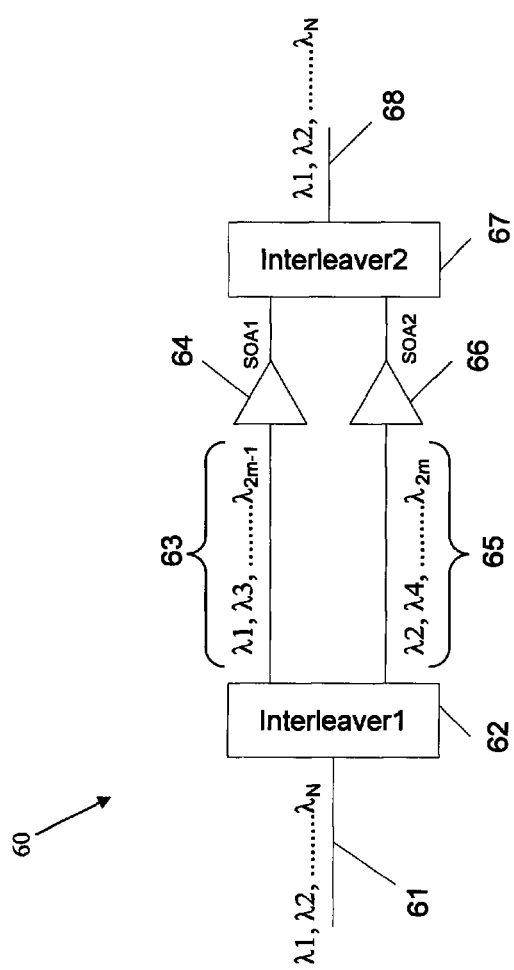
FIG. 6 is a block diagram showing the characteristics of wavelength interleaving amplifier modules shown in FIG. 2.

FIG. 6 is a block diagram showing the characteristics of wavelength interleaving in the semiconductor optical amplifier modules shown in FIG. 2 for purpose of four-wave mixing mitigation. As shown, the wavelength interleaving 60 begins with an input optical signal 61 that is fed into interleaver 62. The output of interleaver 62 includes two optical signals 63 and 64 that are wavelength interleaved. As shown, each optical signal includes every other optical wavelength. In the example shown, the first optical signal 63 includes $\lambda_1$, $\lambda_3$, ... $\lambda_{2m-1}$, and the second optical signal 65 includes $\lambda_2$, $\lambda_4$, ... $\lambda_{2m}$. Each of the first and second optical signal output 63 and 65 are amplified at semiconductor amplifier modules 64 and 66, respectively. The amplified optical signals are fed into a second interleaver 67 where the wavelength interleaved optical signals are combined to reconstruct the original input optical signal 61 as optical output signal 68.

Figure 7:
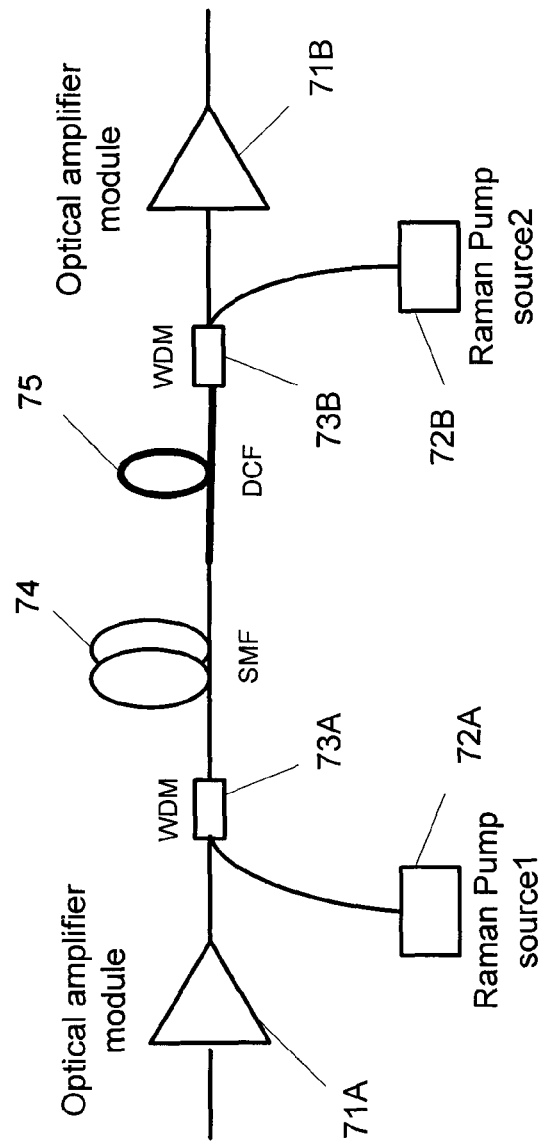
FIG. 7 is a schematic diagram showing an embodiment of the optical amplification to improve the performance.

In addition to using semiconductor optical amplifier, in an embodiment, Raman amplifiers in the 1.3 micron window are used as shown in FIG. 7. FIG. 7 is a schematic diagram showing an embodiment of the optical amplification to improve the performance of the system of the present invention where Raman pumps are used in conjunction with optical amplifier modules shown in FIG. 2. In this embodiment of the invention, the output of the optical amplifier 71A is fed into a wave-division multiplexer 73 that is pumped by Raman pump source 72A. The wave-division multiplexed optical signal is transmitted through sections of single mode fiber 74 and dispersion compensation fiber 75. the transmitted optical signal is fed into another wave-division multiplexer 73B which is also pumped with a Raman pump source 72B and the output is amplified by optical amplifier module 71B. The optical amplification technique shown in FIG. 7 is used to improve the performance of the transmission system of the present invention.

Figure 8:
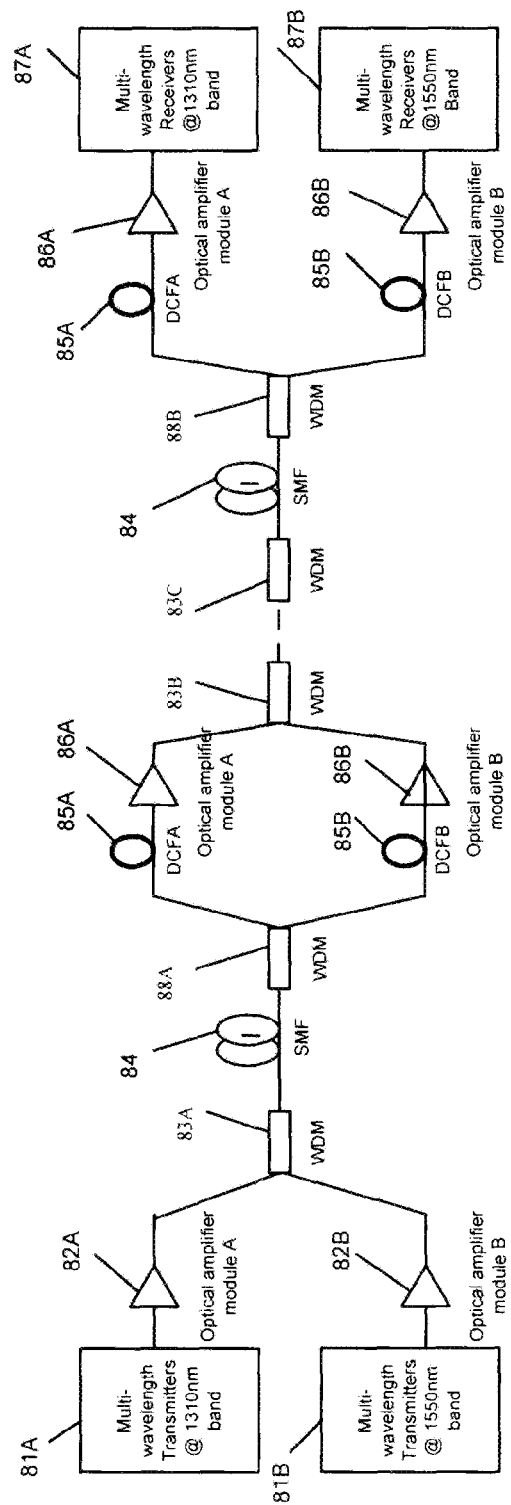
FIG. 8 is a schematic diagram of another preferred embodiment of the wave-division multiplexing transmission system operating at both O-Band and at C-Band.

The O-band transmission system can be used in combination with conventional C-band transmission as shown in FIG. 8 to reduce four-wave mixing. FIG. 8 is a schematic diagram of another preferred embodiment of the wavelength division multiplexing transmission system operating at both O-Band and at C-Band. In the preferred embodiment shown in FIG. 8, the front end of the system includes a multi-wavelength transmitter at 1310 nm band (O-band) 81A and a second multi-wavelength transmitters at 1560 nm band 81B (C-band). Each optical signal is amplified at optical amplifier modules 82A and 82B, respectively before the two signals are fed into the first wave-division multiplexer 83A. The wave-division multiplexed output signal is transmitted through a single mode fiber to a first wave-division demultiplexer 88A where the multiplexed optical signals are separated back into separate O-band wavelength optical signal and C-band wavelength optical signal optical signals. At this phase, the demultiplexed optical signals pass through a section of dispersion compensated fiber 85A and 85B and are amplified at optical amplifiers 86A and 86B, respectively.

In the next phase, the amplified signals from the optical amplifier modules 86A and 86B are fed into the second wave-division multiplexer 83B in the transmission path. The two optical inputs are combined into a single optical signal before traveling over a transmission span to the second wavelength division demultiplexer 88B where the single optical signal is divided back into two separate digital optical signals. Because the combined transmitted signal includes optical signals in the O-band and the C-band, the O-band signals must be separated from the C-band optical signals prior to amplification. The two optical signals are each transmitted over a span of dispersion compensated fiber 85A and 85B then amplified at optical amplifiers 86A and 86B, respectively, that are each configured for operation in the specific band.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim:

1. A wavelength division multiplexing system operating at O-Band and C-Band comprising:
   an O-Band transmitter for generating a digital O-Band optical signal; a C-Band transmitter for generating a digital C-Band optical signal;
   an O-Band and a C-Band optical amplifier module connected with the O-Band and C-Band transmitters respectively, for amplifying the O-Band and C-Band optical signals;
   a first wavelength division multiplexer for wavelength multiplexing the O-Band optical signal with the C-Band optical signal;
   a fiber transmission span using constant intensity modulation and semiconductor optical amplification, the transmission span comprising:
   a wavelength division demultiplexer coupled to an end of the single mode fiber for restoring the length of single mode fiber for restoring the original O-Band optical signal and C-band optical signal;
   a length of O-Band optical dispersion compensation serially coupled with an O-Band optical amplifier for dispersion compensation and amplification coupled with the output of the wavelength division demultiplexer;
   a length of C-Band optical dispersion compensation serially coupled with a C-Band optical amplifier for dispersion compensation and amplification coupled with the output of the wavelength division demultiplexer; and
   a second wavelength division multiplexer for multiplexing the amplified O-Band and C-Band optical signals for transmission over a second length of single mode fiber;

an amplification and dispersion compensation module coupled into the fiber transmission span to separately amplify each of the O-Band optical signals and C-Band optical signals and compensate for the dispersion caused by the fiber transmission span and to reduce four-wave mixing;

a first wavelength division demultiplexer for receiving the transmitted multiplexed optical signal and restoring and O-Band and C-Band optical signals;

an O-Band and a C-Band receivers for receiving restored digital O-Band and C-Band optical signals, respectively.

2. The system of claim 1, further comprising:
polarization-shift keying modulation.

3. The system of claim 2, wherein the polarization-shift keying modulation is differential polarization-shift keying.

4. The system of claim 1, wherein the O-band and C-band receivers includes coherent demodulation using a local oscillator.

5. The system of claim 1, further comprising:
polarization interleaving.

6. The system of claim 1, wherein the fiber transmission span includes dispersion compensation grating to overcome the distortion of the optical signals as they are transmitted through the fiber transmission span.

7. The system of claim 1, wherein a dispersion of the O-band and C-band optical amplifier modules are enhanced by waveguide design.

8. The system of claim 1, wherein the fiber transmission span includes:

an optical amplification module including a Raman pump source for optical amplification to improve the performance of the system.

* * * * *